United States Patent
Lai

(10) Patent No.: US 10,228,440 B2
(45) Date of Patent: Mar. 12, 2019

(54) POSITIONING SYSTEM AND METHOD

(71) Applicant: ECOLUX Holding Co., Ltd., Road Town, Tortola (VG)

(72) Inventor: Yu-Cheng Lai, Zhubei (TW)

(73) Assignee: Ecolux Holding Co., Ltd., Tortola (VG)

( * ) Notice: Subject to any disclaimer, the term of this patent is extended or adjusted under 35 U.S.C. 154(b) by 337 days.

(21) Appl. No.: 15/166,395

(22) Filed: May 27, 2016

(65) Prior Publication Data

US 2016/0377699 A1 Dec. 29, 2016

(30) Foreign Application Priority Data

Jun. 26, 2015 (TW) .............................. 104120859 A

(51) Int. Cl.
*G01S 5/02* (2010.01)
*G01S 1/68* (2006.01)
*H04W 64/00* (2009.01)

(52) U.S. Cl.
CPC .............. *G01S 5/0284* (2013.01); *G01S 1/68* (2013.01); *H04W 64/00* (2013.01); *Y02D 70/00* (2018.01); *Y02D 70/144* (2018.01)

(58) Field of Classification Search
CPC . G01S 5/0284; G01S 5/08; G01S 1/68; G01S 1/02; G01C 21/22; H04W 64/00; H04W 64/006
USPC ......................................................... 342/451
See application file for complete search history.

(56) References Cited

U.S. PATENT DOCUMENTS

| 5,493,283 | A | 2/1996 | Hopper et al. |
| 5,646,632 | A | 7/1997 | Khan et al. |
| 6,275,705 | B1 | 8/2001 | Drane et al. |
| 6,420,996 | B1 * | 7/2002 | Stopczynski ......... G01S 13/765 340/435 |
| 6,839,027 | B2 | 1/2005 | Krumm et al. |
| 6,865,347 | B2 | 3/2005 | Perkins et al. |
| 7,171,216 | B1 | 1/2007 | Choksi |
| 7,363,044 | B2 | 4/2008 | Korneluk et al. |
| 7,538,716 | B2 | 5/2009 | Lai et al. |
| 8,280,412 | B2 | 10/2012 | Rudolf et al. |
| 9,736,637 | B2 | 8/2017 | Larsen |
| 9,763,043 | B2 | 9/2017 | Larsen |
| 2010/0113083 | A1 * | 5/2010 | Luo ...................... H04W 48/10 455/515 |

(Continued)

FOREIGN PATENT DOCUMENTS

| CN | 103728644 A | 4/2014 |
| CN | 104270710 A | 1/2015 |
| TW | I432761 B | 4/2014 |

*Primary Examiner* — Harry K Liu
(74) *Attorney, Agent, or Firm* — Alan D. Kamrath; Kamrath IP Lawfirm, P.A.

(57) ABSTRACT

A positioning system includes a first wireless transceiver and a second wireless transceiver. After the first wireless transceiver sends search information to the second wireless transceiver and the second wireless transceiver receives the search information, response information is generated and sent to the first wireless transceiver. After the first wireless transceiver receives the response information, the position of the second wireless transceiver is obtained by computation. The positioning system and method have the features of easy installation, low construction cost, high positioning precision, 3D positioning, and power saving.

19 Claims, 3 Drawing Sheets

(56) References Cited

U.S. PATENT DOCUMENTS

| | | | |
|---|---|---|---|
| 2010/0271263 A1* | 10/2010 | Moshfeghi | G01S 5/0263 342/378 |
| 2011/0110338 A1* | 5/2011 | Khoryaev | G01S 5/0215 370/335 |
| 2012/0256726 A1* | 10/2012 | Honkanen | H04W 64/006 340/10.1 |
| 2013/0028246 A1* | 1/2013 | Gonikberg | H04W 64/00 370/338 |
| 2013/0343338 A1* | 12/2013 | Campos | H04W 16/28 370/330 |
| 2015/0126216 A1* | 5/2015 | Mullins | G01S 3/46 455/456.1 |
| 2016/0109558 A1 | 4/2016 | Sugita et al. | |
| 2016/0238690 A1* | 8/2016 | Colucci | G01S 1/68 |
| 2016/0370450 A1* | 12/2016 | Thorn | G01S 3/46 |

* cited by examiner

POSITIONING SYSTEM AND METHOD

BACKGROUND OF THE INVENTION

Field of the Invention

The present invention relates to a positioning system and method and, more particularly, to the positioning system and method that precisely obtain a target position using the time difference of receiving and sending information.

Description of the Related Art

Positioning systems are mainly divided into the following four types: a triangulation positioning system, a proximity positioning system, a scene analysis positioning system, and a mixed positioning system. For the triangulation positioning system, refer to U.S. Pat. No. 5,646,632 entitled "Method and apparatus for a portable device to identify its own location" and U.S. Pat. No. 6,275,705 entitled "Location and tracking system". Both patents use the characteristics of a distance or an angle between a base station or a sensor and a user for the positioning purpose. If a distance is used, the time for a signal transmission or the degree of signal attenuation will be used for computation. If an angle is used, an included angle between two reference points will be used for determining a position, and the angle may be obtained from a specially designed hardware device.

With reference to P.R.C. Pat. No. 104270710 entitled "A Bluetooth indoor positioning system based on iBeacon", iBeacons are used to construct a wireless sensor network, and each iBeacon acts as a beacon node. A RSSI algorithm is used to measure the distance from an unknown node to a plurality of beacon nodes, and triangulation and maximum likelihood algorithms are used for the Bluetooth positioning system for the comprehensive evaluation of the location of the finally confirmed unknown node. However, the accuracy of the RSSI algorithm may be affected and interfered by the environment easily, so that the positioning precision is not accurate enough and so that the valid range is limited. On the other hand, the positioning technology of the triangulation algorithm has a common characteristic of requiring at least two or three base stations to determine an object's position and a relatively more complicated system layout.

For the proximity positioning system, refer to U.S. Pat. No. 5,493,283 entitled "Locating and authentication system". The range of coverage of a base station or a sensor must be changed according to the required positioning precision. If the required precision is high, the range of coverage has to be small. The number of base stations or sensors will be large, and the construction cost will be very expensive.

For the scene analysis positioning system, refer to U.S. Pat. No. 6,839,027 entitled "Location measurement process for radio-frequency badges employing path constrains". The process requires specific databases built for different environments respectively, so that the configuration is more complicated. The signal intensity of several wireless network base stations in the environment is used to determine the location of a user, thus requiring the measurement of a signal intensity of different positions in advance in order to build the database of the signal intensities at different positions. Then, the currently measured signal intensity is used to further obtain the most probable position.

For the mixed positioning system, refer to R.O.C. Pat. No. 1432761 entitled "Position detecting method and system, and distance measuring method". The system comprises a plurality of signal transmission devices, a wireless coordination device, and a plurality of sensing apparatuses. The sensing apparatus includes a wireless sensing device, and a timer is started when the signal transmission device receives a radio frequency signal. When the signal transmission device receives an ultrasonic signal, the time difference of receiving the radio frequency signal and the ultrasonic signal is used to estimate and obtain a measured distance value of the distance of the signal transmission device. However, this system requires a plurality of signal transmission devices, and a plurality of sensing apparatuses, so that it results in a high construction cost.

Refer to U.S. Pat. No. 6,865,347 entitled "Optically-based location system and method for determining a location at a structure". A camera device and specially designed hardware are used to measure the azimuth, the angle of elevation, and the distance of an incident light. However, the result of this method may be affected by sunlight or other light sources, so that its practicability is low.

Refer to R.O.C. Pat. No. 1398180 entitled "Actor assisted enhanced positioning method". An upstream signal of a first UE and at least one second UE is received and marked, and a downstream signal at the first UE and coming from at least one base station is received and marked. The time labels are used to determine the time difference of the observed arrivals. The position of the first UE is determined by the determined arrival time difference. However, the time difference of this patented technology is determined by an elliptical area of several base stations.

Refer to R.O.C. Pat. Appln. No. 103119118 entitled "Positioning system, positioning method, and positioning program". The information of a plurality of signal sources and the received record of a plurality of non-audible sounds in a mobile terminal are used for the positioning purpose. However, this technology requires the plurality of signal sources and the plurality of non-audible sounds, thus incurring complicated construction and high cost.

In view of the aforementioned problems, a feasible solution is provided to overcome the problems of the prior art.

SUMMARY OF THE INVENTION

Therefore, it is a primary objective of the present invention to provide a positioning system and method capable of simplifying the complexity of the positioning system and improving the positioning accuracy.

To achieve the aforementioned objective, the present invention provides a positioning system comprising a first wireless transceiver and a second wireless transceiver. The first wireless transceiver is provided for continuously scanning a space range, generating and transmitting search information at any spatial angle, receiving response information, and estimating and storing a relative position. The second wireless transceiver is provided for receiving the search information, and computing and transmitting the response information. The first wireless transceiver receives the response information, confirms its validity, and estimates and stores the relative position and time of the second wireless transceiver. The first wireless transceiver comprises a first computing unit, at least one directional transmission unit, a space scan driving unit, a first omnidirectional transceiver unit, a first memory, and a first control unit. The first computing unit is provided for generating the search information and estimating the relative position of the second wireless transceiver. The directional transmission unit is provided for sending the search information. The space scan driving unit is provided for driving the directional transmission unit to scan and search a space range. The first omnidirectional transceiver unit is provided for receiving the response information. The first memory is provided for storing the search information and the relative position of the second wireless transceiver. The first control unit is provided for controlling the operation of the first computing unit, the directional transmission unit, the space scan driving unit, the first omnidirectional transceiver unit, and the first memory. The second wireless transceiver comprises an omnidirectional receiver unit, a second computing unit, a second memory, a second omnidirectional transceiver unit, and a second control unit. The omnidirectional receiver unit is provided for receiving the search information. The second computing unit is provided for generating the response information. The second memory is provided for storing the response information. The second omnidirectional transceiver unit is provided for sending the response information. The second control unit is provided for controlling the operation of the omnidirectional receiver unit, the second computing unit, the second memory, and the second omnidirectional transceiver unit.

To save the power consumption of the second wireless transceiver, the second wireless transceiver further comprises a wakeup unit. Only the second omnidirectional transceiver unit is turned on all the time. The first omnidirectional transceiver unit sends a wakeup message to the second omnidirectional transceiver unit, and the wakeup unit activates the second control unit, the omnidirectional receiver unit, the second computing unit, and the second memory.

The present invention further provides a positioning method comprising the following steps. A first computing unit generates search information, and the search information is formed by an identification code of a first wireless transceiver, a transmission identification code of a directional transmission unit, and a transmitting time of the search information. At least one directional transmission unit is driven by a space scan driving unit to transmit the search information towards a spatial angle at the transmitting time of the search information. A first control unit stores the transmission identification code of the directional transmission unit, the transmitting time of the search information, and the spatial angle to a first memory. An omnidirectional receiver unit receives the search information at a receiving time of the search information. A second computing unit generates response information, and the response information is formed by the search information, the identification code of the second wireless transceiver, the receiving time of the search information, and a transmitting time of the response information. A second omnidirectional transceiver unit transmits the response information at the transmitting time of the response information. A second control unit stores the response information into the second memory. A first omnidirectional transceiver unit receives the response information at a receiving time of the response information. The first computing unit uses the response information and its receiving time to estimate a relative position of the second wireless transceiver. The first control unit stores the identification code of the second wireless transceiver, the transmitting time of the response information, and the relative position into the first memory.

The positioning system and method of the present invention simply require the construction of a first wireless transceiver in the space to estimate the relative positions of a plurality of second wireless transceivers. Compared with the prior art requiring more sensors or an optimal adjustment of different sensors for different environments, the present invention reduces the construction complexity and locating objects accurately in 3D space.

DETAILED DESCRIPTION OF THE PREFERRED EMBODIMENTS

The technical characteristics, contents, advantages and effects of the present invention will be apparent with the detailed description of preferred embodiments accompanied with related drawings as follows.

Figure 1:
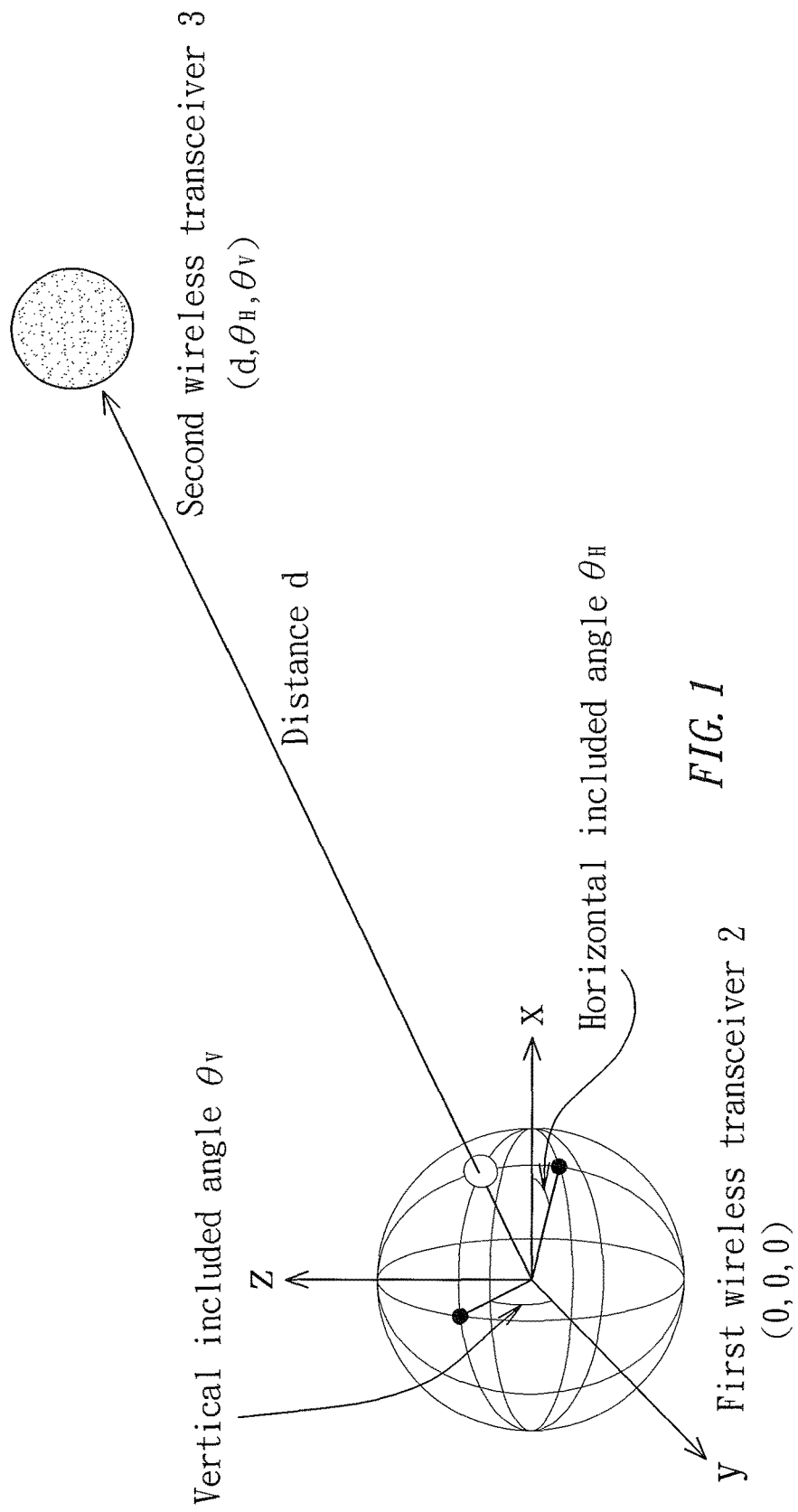
FIG. 1 is a schematic view of an application of an embodiment of the present invention.
Figure 2:
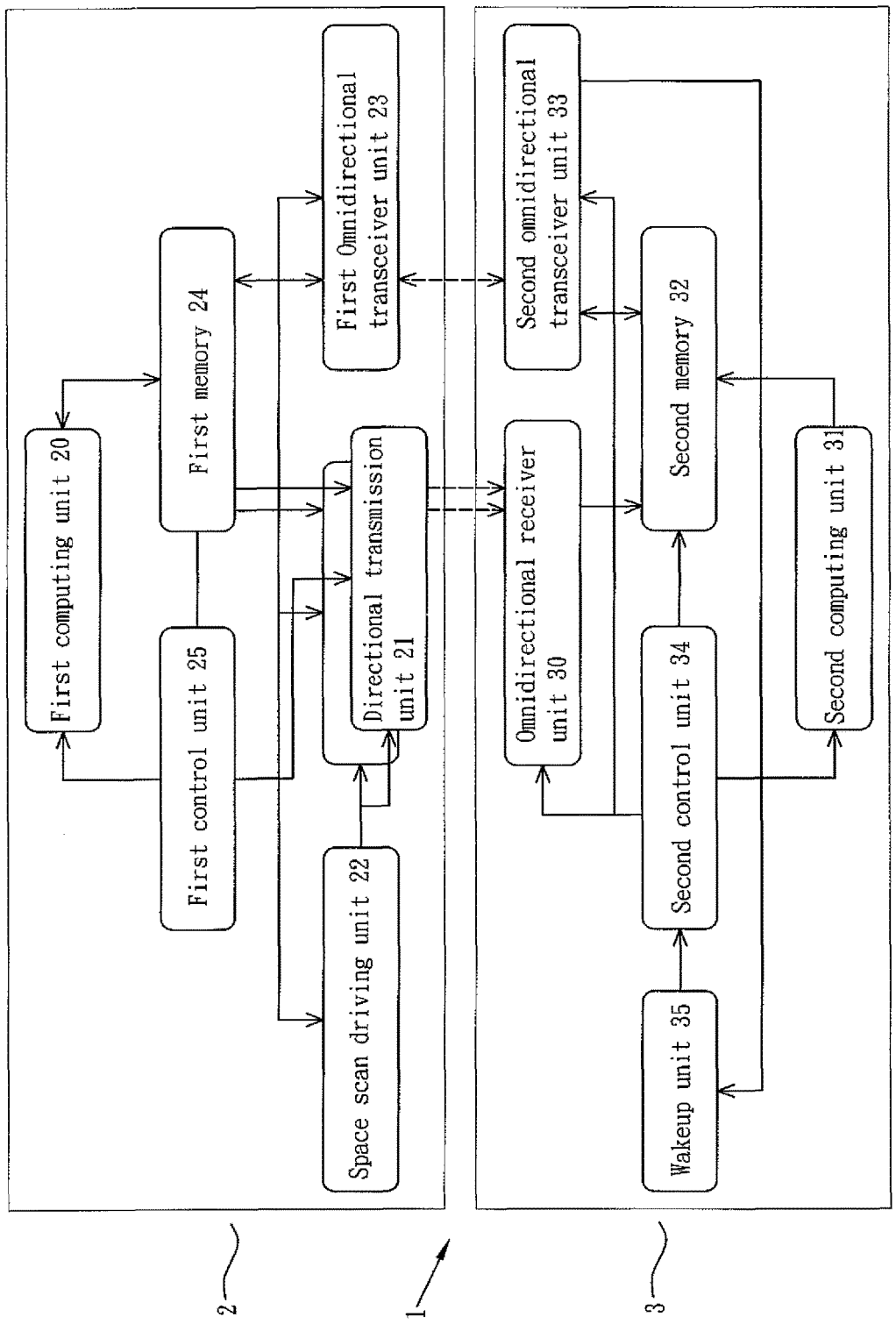
FIG. 2 is a system block diagram of an embodiment of the present invention.
Figure 3:
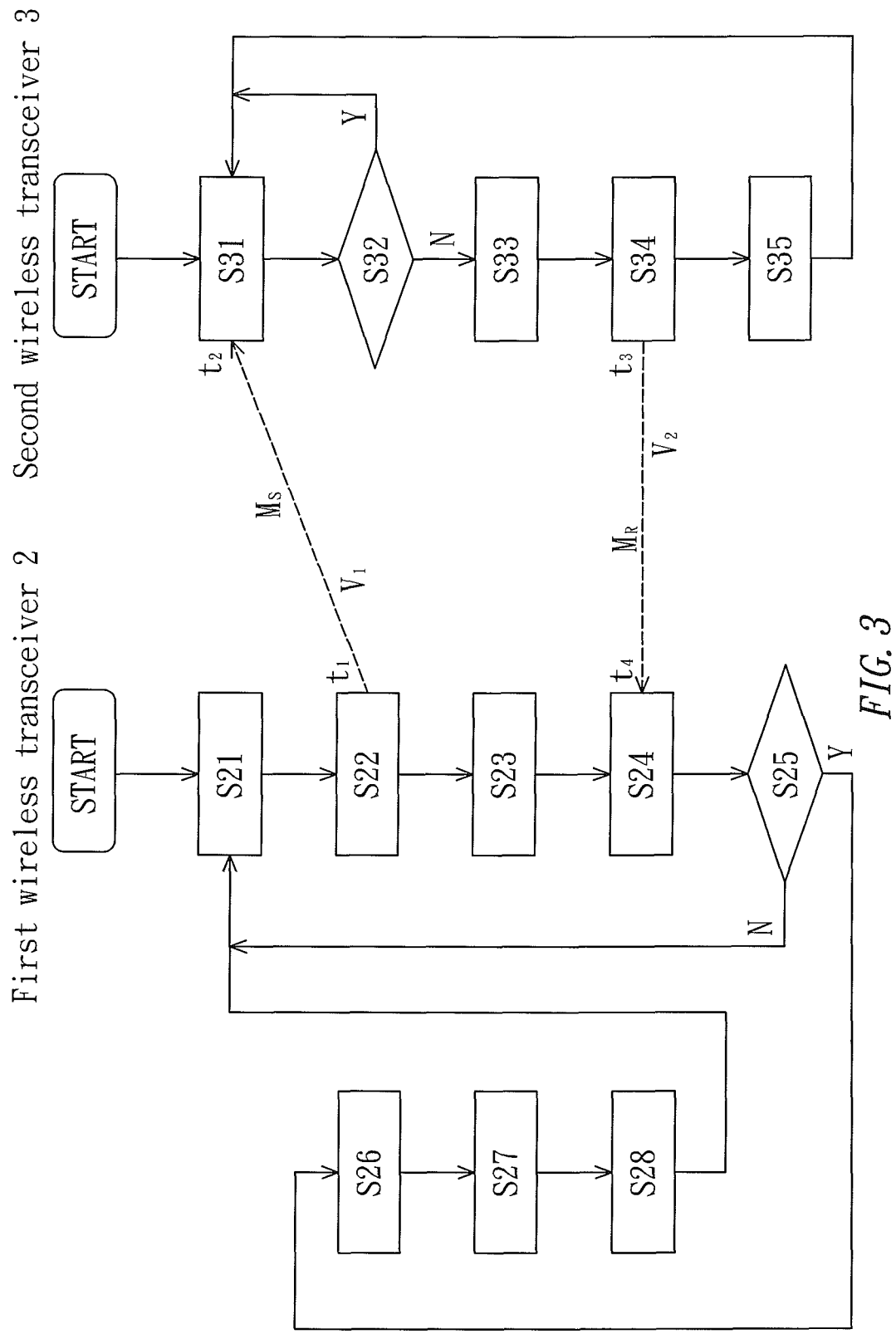
FIG. 3 is a flow chart of a method of an embodiment of the present invention.

With reference to FIGS. 1 to 3 for a positioning system 1 of the present invention, the positioning system 1 comprises a first wireless transceiver 2, and a second wireless transceiver 3. The position of the first wireless transceiver 2 is known, and the position of the second wireless transceiver 3 is to be estimated. In FIG. 1, the distance between the first wireless transceiver 2 and the second wireless transceiver 3 is d. A horizontal included angle between the first wireless transceiver 2 and the second wireless transceiver 3 is θH, and a vertical included angle between the first wireless transceiver 2 and the second wireless transceiver 3 is θV. The objective of the present invention is to obtain the relative position (d, θH, θV) of the second wireless transceiver 3.

In FIG. 2, the first wireless transceiver 2 comprises a first computing unit 20, at least one directional transmission unit 21, a space scan driving unit 22, a first omnidirectional transceiver unit 23, a first memory 24, and a first control unit 25. The second wireless transceiver 3 comprises an omnidirectional receiver unit 30, a second computing unit 31, a second memory 32, a second omnidirectional transceiver unit 33, a second control unit 34, and a wakeup unit 35.

With reference to FIG. 3 for a positioning method of the present invention, the positioning method comprises the following steps:

S21: The first computing unit 20 generates search information MS, and the search information MS is formed by an identification code IDDev1 of the first wireless transceiver 2, a transmission identification code IDTx1 of the directional transmission unit 21, and a time t1. Without losing the generalization, the search information can be represented by MS=(IDDev1, IDTx1, t1).

S22: The directional transmission unit 21 is driven by the space scan driving unit 22 to transmit the search information MS towards a spatial angle (θH, θV) at the time t1.

S23: The first control unit 25 stores the transmission identification code IDTx1, the transmitting time t1 of the search information MS, and the spatial angle (θH, θV) to the first memory 24.

S31: The omnidirectional receiver unit 30 receives the search information MS at a time t2.

S32: Look up the search information MS from all transmitted response information from the second memory 32. If it exists, the search information MS will be discarded, and Step S31 will be carried out; and if it does not exist, Step S33 will be carried out.

S33: The second computing unit 31 generates response information MR, and the response information MR is formed by the search information MS, an identification code IDDev2 of the second wireless transceiver 3, a receiving time t2 of the search information MS, and a time t3. Without losing the generalization, the response information MR can be represented by MR=(IDDev1, IDTx1, t1, IDDev2, t2, t3).

S34: The second omnidirectional transceiver unit 33 transmits the response information MR at the time t3.

S35: After the response information MR is confirmed to be received by the first wireless transceiver 2, the second control unit 34 stores the response information MR into the second memory 32.

S24: The first omnidirectional transceiver unit 23 receives the response information MR at a time t4.

S25: The first computing unit 20 compares the identification code of the first wireless transceiver of the response information MR with its own identification code IDDev1; if they are not the same, the response information MR will be discarded, and Step S21 will be carried out; and if they are the same, Step S26 will be carried out.

S26: Assuming that the clock of the first wireless transceiver 2 and the clock of the second wireless transceiver 3 are synchronous, the signal propagation speed V1 of the directional transmission unit 21 and the signal propagation speed V2 of the second omnidirectional transceiver unit 33 can be used for estimating the distance d as follows:

$$d=\min\{V1*(t2-t1), V2*(t4-t3)\}.$$

S27: The transmission identification code IDTx1 in the response information MR and the transmitting time t1 of the search information MS are used to look up the spatial angle ($\theta H$, $\theta V$) from the first memory 24, to obtain the relative position (d, $\theta H$, $\theta V$).

S28: Store the identification code IDDev2 of the second wireless transceiver 3, the transmitting time t3 of the response information MR, and the relative position (d, $\theta H$, $\theta V$) into the first memory 24, and carry out Step S21.

In FIG. 2, when the second wireless transceiver 3 is normally idled, only the second omnidirectional transceiver unit 33 is turned on all the time in order to save the power consumption of the second wireless transceiver 3. The first wireless transceiver 2 may transmit a wakeup message to the second omnidirectional transceiver unit 33 through the first omnidirectional transceiver unit 23, so that the wakeup unit 35 transmits a signal to the second control unit 34 to activate the second control unit 34, the omnidirectional receiver unit 30, the second computing unit 31, and the second memory 32, and then carry out the aforementioned positioning steps.

In summation of the description above, the present invention achieves the expected functions and objectives. While the invention has been described by means of specific embodiments, numerous modifications and variations could be made thereto by those skilled in the art without departing from the scope and spirit of the invention set forth in the claims.

What is claimed is:

1. A positioning system comprising:
   a first wireless transceiver configured to continuously scan a three-dimensional (3D) space range and generate and transmit search information at a three-dimensional (3D) spatial angle within the three-dimensional (3D) space range, with the search information including an identification code of the first wireless transceiver, a transmission identification code of at least one directional transmission unit of the first wireless transceiver and a transmitting time of a transmission of the search information; and
   a second wireless transceiver configured to receive the search information and to compute and transmit response information, with the response information including the search information;
   wherein the first wireless transceiver is further configured to receive the response information from the second wireless transceiver, to confirm validity of the response information, to use the transmission identification code and the transmitting time to look up the three-dimensional (3D) spacial angle within the three-dimensional (3D) space range at which the search information was transmitted by the first wireless transceiver, to estimate and store a relative position of the second wireless transceiver and to store a response time at which the response information was transmitted by the second wireless transceiver.

2. The positioning system according to claim 1, wherein the first wireless transceiver comprises:
   a first computing unit configured to generate the search information and estimate the relative position of the second wireless transceiver;
   a space scan driving unit configured to drive the at least one directional transmission unit to operate and scan the three-dimensional (3D) space range;
   a first omnidirectional transceiver unit configured to receive the response information;
   a first memory configured to store the search information, the transmitting time of the search information from the first wireless transceiver, the three-dimensional (3D) spatial angle, and the relative position of the second wireless transceiver; and
   a first control unit configured to control the first computing unit, the at least one directional transmission unit, the space scan driving unit, the first omnidirectional transceiver unit, and the first memory,
   wherein the at least one directional transmission unit is configured to transmit the search information.

3. The positioning system according to claim 1, wherein the second wireless transceiver comprises:
   an omnidirectional receiver unit configured to receive the search information;
   a second computing unit configured to generate the response information;
   a second memory configured to store the response information;
   a second omnidirectional transceiver unit configured to transmit the response information; and
   a second control unit configured to control the omnidirectional receiver unit, the second computing unit, the second memory, and the second omnidirectional transceiver unit.

4. The positioning system according to claim 2, wherein the three-dimensional (3D) space range refers to all spatial angles pointed by the at least one directional transmission unit which is driven by the space scan driving unit.

5. The positioning system according to claim 2, wherein the search information received with the response information includes the transmission identification code of the at least one directional transmission unit and the transmitting time for the first wireless transceiver to transmit the search information, and wherein the received search information is configured to look up the three-dimensional (3D) spacial angle from the first memory to obtain an estimate of the relative position of the second wireless transceiver.

6. The positioning system according to claim 2, wherein the response information further includes a second wireless transceiver identification code, a transceiver time at which the second wireless transceiver received the search information from the first wireless transceiver, and the response time at which the second wireless transceiver transmitted the response information.

7. The positioning system according to claim 1, wherein the relative position refers to a relative coordinate of the second wireless transceiver with respect to the first wireless transceiver, and wherein the relative coordinate is formed by a distance, a horizontal included angle, and a vertical included angle between the second wireless transceiver and the first wireless transceiver.

8. The positioning system according to claim 1, wherein the second wireless transceiver has a wakeup unit.

9. A positioning method comprising:
   continuously scanning a three-dimensional (3D) space range by a first wireless transceiver;
   generating and transmitting search information by the first wireless transceiver at a three-dimensional (3D) spatial angle within the three-dimensional (3D) space range, with the search information including an identification code of the first wireless transceiver, a transmission identification code of at least one directional transmission unit of the first wireless transceiver and a transmitting time of a transmission of the search information;
   receiving the search information from a second wireless transceiver and computing and transmitting response information by the second wireless transceiver, with the response information including the search information; and
   receiving the response information at the first wireless transceiver, confirming validity of the response information, storing a response time of receipt of the response information by the first wireless transceiver, using the transmission identification code and the transmitting time to look up the three-dimensional (3D) spacial angle within the three-dimensional (3D) space range at which the search information was transmitted by the first wireless transceiver, and estimating and storing a relative position of the second wireless transceiver and a response time at which the response information was transmitted by the second wireless transceiver by the first wireless transceiver.

10. The positioning method according to claim 9, further comprising the first wireless transceiver:
    generating the search information, and estimating the relative position of the second wireless transceiver with a first computing unit;
    sending the search information with the at least one directional transmission unit;
    driving the at least one directional transmission unit to operate and scan the three-dimensional (3D) space range with a space scan driving unit;
    receiving the response information with a first omnidirectional transceiver unit;
    storing the search information, the transmitting time of the search information from the first wireless transceiver, the corresponding three-dimensional (3D) spatial angle, and the relative position of the second wireless transceiver in a first memory; and
    controlling the first computing unit, the at least one directional transmission unit, the space scan driving unit, the first omnidirectional transceiver unit, and the first memory with a first control unit.

11. The positioning method according to claim 9, further comprising the second wireless transceiver:
    receiving the search information with an omnidirectional receiver unit;
    generating the response information with a second computing unit;
    storing the response information in a second memory;
    transmitting the response information with a second omnidirectional transceiver unit; and
    controlling the omnidirectional receiver unit, the second computing unit, the second memory, and the second omnidirectional transceiver unit with a second control unit.

12. The positioning method according to claim 10, wherein the three-dimensional (3D) space range refers to all three-dimensional (3D) spatial angles pointed by the at least one directional transmission unit which is driven by the space scan driving unit.

13. The positioning method according to claim 10, wherein the three-dimensional (3D) spatial angle refers to a spatial angle pointed by the at least one directional transmission unit when the search information is transmitted.

14. The positioning method according to claim 10, wherein the search information received with the response information includes the transmission identification code of the at least one directional transmission unit and the transmitting time for the first wireless transceiver to transmit the search information, and wherein the received search information is configured to look up the three-dimensional (3D) spacial angle from the first memory to obtain an estimate of the relative position of the second wireless transceiver.

15. The positioning method according to claim 10, wherein the response information includes a second wireless transceiver identification code, the transceiver time at which the second wireless transceiver received the search information from the first wireless transceiver, and the response time at which the second wireless transceiver transmitted the response information.

16. The positioning method according to claim 9, wherein the relative position refers to a relative coordinate of the second wireless transceiver with respect to the first wireless transceiver, and wherein the relative coordinate is formed by a distance, a horizontal included angle, and a vertical included angle between the second wireless transceiver and the first wireless transceiver.

17. The positioning method according to claim 14, wherein the identification code of first wireless transceiver of the response information is compared with the identification code included in the search information transmitted by the first wireless transceiver to confirm validity of the response information.

18. The positioning method according to claim 11, wherein a signal propagation speed of the at least one directional transmission unit, a signal propagation speed of the second omnidirectional transceiver unit, a time for the first wireless transceiver to transmit the search information, a time for the second wireless transceiver to receive the search information, a time for the second wireless transceiver to transmit the response information, and a time for the first wireless transceiver to receive the response information are used to estimate the relative position of the second wireless transceiver.

19. The positioning method according to claim 9, wherein the second wireless transceiver has a wakeup unit.

* * * * *